United States Patent [19]

Lawson et al.

[11] Patent Number: 4,495,095
[45] Date of Patent: Jan. 22, 1985

[54] ACIDULATION AND RECOVERY OF CRUDE TALL OIL FROM TALL OIL SOAPS

[75] Inventors: Nelson E. Lawson, Trenton; Gamal I. Amer, Lawrenceville, both of N.J.

[73] Assignee: Union Camp Corporation, Wayne, N.J.

[21] Appl. No.: 481,811

[22] Filed: Apr. 4, 1983

[51] Int. Cl.³ .................... C09F 93/00; C11D 15/00
[52] U.S. Cl. .................................. 260/97.7; 260/97.6
[58] Field of Search ........................ 260/97.6, 97.7

[56] References Cited

U.S. PATENT DOCUMENTS

| | | | |
|---|---|---|---|
| 2,232,331 | 2/1941 | Leithe et al. | 260/419 |
| 3,965,085 | 6/1976 | Holmbom et al. | 260/97.7 |
| 3,969,196 | 7/1976 | Zosel | 203/49 |
| 4,075,188 | 2/1978 | Vardell | 260/97.7 |
| 4,250,331 | 2/1981 | Shimshick | 562/485 |
| 4,308,200 | 12/1981 | Fremont | 260/97.7 |
| 4,349,415 | 9/1982 | De Filippi et al. | 203/14 |
| 4,422,966 | 12/1983 | Amer | 260/97.7 |

Primary Examiner—Herbert S. Cockeram
Attorney, Agent, or Firm—Kane, Dalsimer, Kane, Sullivan and Kurucz

[57] ABSTRACT

In the present invention, tall oil acids are prepared by acidulating tall oil soap with supercritical fluid carbon dioxide. The method of preparation is carried out at a temperature of from about 31° to 400° C. and the supercritical carbon dioxide is under a pressure of from about 1075 to about 50,000 psi. The acidulate is extracted into the fluid phase of the supercritical carbon dioxide. The resultant tall oil acids are then recovered from the carbon dioxide fluid phase.

4 Claims, 1 Drawing Figure

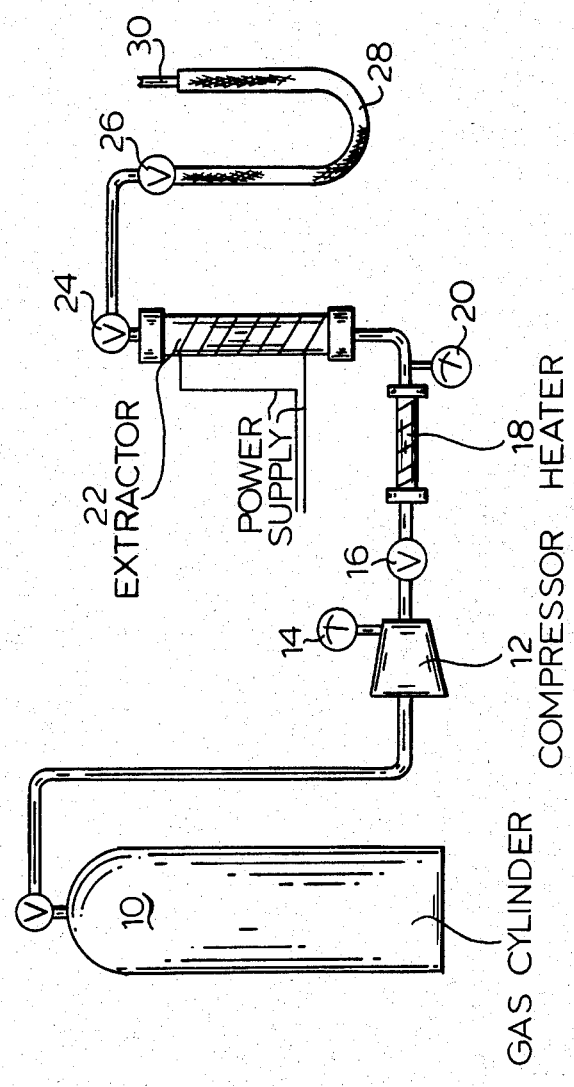

ACIDULATION AND RECOVERY OF CRUDE TALL OIL FROM TALL OIL SOAPS

BACKGROUND OF THE INVENTION

1. Field of the Invention

The present invention relates to processes for the recovery of crude tall oil from tall oil soaps and in particular to a process for the concurrent acidulation and extraction of fatty and resin acids from the soaps with supercritical carbon dioxide.

2. Brief Description of the Prior Art

Tall oil soaps are obtained from the black liquor resulting from the alkaline digestion of wood. When the black liquor is concentrated and allowed to settle, the tall oil soap rises as a top layer. The top layer is skimmed off and may be subsequently acidified with a strong polar acid, usually sulfuric acid, to convert the tall oil soaps to crude tall oil, i.e., free fatty and resin acids. The reaction may be represented by the schematic formulae:

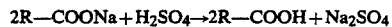

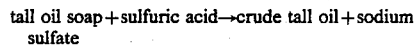

tall oil soap + sulfuric acid → crude tall oil + sodium sulfate when sulfuric acid is used as the acidulation agent.

The acidified soap skimmings are allowed to stand and separate into three layers—a crude tall oil layer containing the fatty acids, resin acids and neutrals, a lignin layer, and a sulfate-brine layer. The separated crude tall oil layer may be fractionally distilled to separate and purify the fatty acid and resin acid fractions. The sulfate-brine layer has limited commercial value and, when reintroduced into the pulp mill liquor system, can adversely affect the mill sulfur balance. Accordingly, it has been desirable to find a process for acidulation and recovery of fatty acids and resin acids from tall oil soaps, without the need to use sulfuric acid.

Prior art attempts at solving this problem have met varying degrees of success. For example, acidulation of tall oil soaps with carbon dioxide has been known; see U.S. Pat. No. 2,232,331. However, commercialization of this approach has been hampered because of the poor yields (resulting from the fact that sufficiently low pHs could not be achieved with carbon dioxide). Recently, it has been shown that yields from the carbon dioxide acidulation of tall oil soaps could be improved by doing so in the presence of a water immiscible solvent. Since the tall oil acids are preferentially soluble in the water-immiscible solvent, the equilibrium of the acidulation reaction is favorably shifted toward the acid products; for example see U.S. Pat. No. 4,075,188.

Processes for the recovery of carboxylic acids from aqueous solutions of their salts through conversion of the salts to free acids by acidulation, and extraction of the free acids with supercritical fluid carbon dioxide has also been described; see U.S. Pat. No. 4,250,331. However, in the latter process, less than about 20% of the salts are recovered as free acids. A fuller description of supercritical fluid extractions may be found in U.S. Pat. No. 3,969,196.

It has now been found that tall oil soaps can be converted to the free acids in near quantitative yields by acidulation with supercritical carbon dioxide, thereby avoiding use of sulfur-based acidulation chemicals. The fatty/resin acids are extracted by the supercritical carbon dioxide. A further advantage is found in that the extracted fatty/resin acids are free of lignin, fibers, inorganics and like contaminants generally associated with the tall oil soaps.

SUMMARY OF THE INVENTION

The invention comprises a method for the preparation of tall oil acids, which comprises; acidulating tall oil soap with supercritical carbon dioxide and recovering the resultant crude tall oil.

BRIEF DESCRIPTION OF THE DRAWING

The FIGURE is a schematic representation of apparatus which may be employed in the method of the invention to acidulate tall oil soap with supercritical fluid carbon dioxide. This drawing is given by way of example and does not restrict the principle of general applicability of the process of the invention.

DETAILED DESCRIPTION OF THE INVENTION

The tall oil soaps used in the process of the invention are obtained from skimmings of black liquor resulting from the alkaline digestion of wood. These soap skimmings comprise a mixture of salts of fatty and resin acids, water and a mixture of other compounds termed "neutrals". The proportion of water is about 50 percent by weight. The soaps are, physically, aqueous emulsions of the fatty/resin acid salts which are calculated as about 7 molar in concentration.

The aqueous emulsions of tall oil soaps are readily acidulated in the process of the invention by contact with supercritical carbon dioxide. The supercritical carbon dioxide used to acidulate the soap and extract the fatty and resin acids may be prepared by a variety of well-known techniques; see for example U.S. Pat. Nos. 3,969,196 and 4,308,200.

The supercritical carbon dioxide may be contacted with the aqueous emulsions of tall oil soaps on a continuous or batch basis, in sufficient quantity to acidulate the acid salts and simultaneously extract the resulting free acids from the soap, thereby pushing the acidulation reaction toward completion.

The pressures required for the supercritical carbon dioxide fluid phase used in the process of the invention are generally between 1075 and 50,000 psi.

Preferred temperatures used in the process of the invention may vary from a little below 31° C. (the critical temperature for carbon dioxide) up to 400° C.

After acidulation of the soap, the free fatty/resin acids are extracted immediately into the supercritical carbon dioxide fluid phase. The supercritical fluid phase is thereafter separated from the remaining soap and the temperature is changed and/or the pressure is decreased to drop out of solution the free acids dissolved therein. The dissolved free acid portions may be individually dropped out of solution by stepwise depressurization and/or temperature change. The resultant depressurized carbon dioxide may be returned to the desired supercritical temperature and pressure for reuse in the process.

The accompanying drawing is a schematic representation of apparatus, simple in nature, which may be employed in the method of the invention and because of its simplicity serves to exemplify the method of the invention. As shown in the accompanying drawing, carbon dioxide from cylinder 10 may be fed by conduits into a compressor 12 wherein it is compressed to supercritical pressure conditions. A pressure gauge 14 monitors the compression and valve 16 provides a means for delivery of the compressed gas to a heater 18 where the temperature of the compressed gas is raised to a supercritical temperature. Temperature gauge 20 monitors the heating of the compressed gas which is then passed into an extractor vessel 22 which is charged with tall oil soap, and provided with an electrical resistance heater means for maintaining the supercritical temperature. The tall oil soap charge is acidulated and concurrently extracted by the supercritical fluid carbon dioxide. When the supercritical gas is introduced into the charged extractor vessel 22, acidulation of fatty and resin acid salts occurs and extraction of the free acids from the tall oil soap begins. Acidulation and extraction are carried out and the solute-laden solvent leaves the extractor 22 through valve 24, with its extracted content of free fatty and resin acids. The extract with the supercritical gas is carried through an expansion valve 26 to reduce the supercritical pressure of the gas. Upon dropping the pressure of the mixture of the gas and extracted free acids, the free acids are dropped from solution in the supercritical fluid as the reduced pressure solvent is vented through end 30 of the separator tube 28. Of course, the vented gas can be recaptured and reused in a continuous process.

The following example sets forth the manner and the process of making and using the invention and sets forth the best mode known to the inventor for carrying out the invention, but should not be interpreted to limit the scope of the invention. Unless otherwise indicated, all percentages given are by weight and all chemical analysis were done by standard high pressure gas chromatograph techniques.

EXAMPLE

Heated extractor 22 was charged with 9.65 gm of tall oil soap and thereafter supercritical carbon dioxide was introduced and exhausted in five successive acidulation/extraction steps in accordance with the foregoing description and at the temperatures and pressures indicated in Table 1, below. The fatty and resin acid products were collected from separator tube 28 and analyzed by gas chromatography.

The analytical results for each successive extraction steps 1 through 5 appear in Table 1, below.

TABLE 1

| STEP NO. | PRESSURE (PSI) | TEMP. (°C.) | AMOUNT EXTRACTED (gms) (WET BASIS) | % FATTY ACID IN EXTRACT (DRY BASIS) | % RESIN ACID IN EXTRACT (DRY BASIS) |
|---|---|---|---|---|---|
| 1 | 4000 | 65 | 0.58 | 61.51 | 26.42 |
| 2 | 4000 | 65 | 1.58 | 48.66 | 28.69 |
| 3 | 4000 | 65 | 2.11 | 41.28 | 36.02 |
| 4 | 4000 | 65 | 1.52 | 40.89 | 37.20 |
| 5 | 5000 | 70 | 0.73 | 37.95 | 34.54 |

From the data in Table 1, it is apparent that the feedstock tall oil soap was acidulated and the fatty acid and resin acid products were extracted in good yields using supercritical carbon dioxide.

What is claimed is:

1. A method for the preparation of crude tall oil which comprises acidulating tall oil soaps with supercritical carbon dioxide and thereafter recovering the resulting acidulated material from the fluid phase of the supercritical carbon dioxide.

2. The method of claim 1 carried out at a temperature of from about 31° to about 400° C.

3. The method of claim 1 wherein the supercritical carbon dioxide is under a pressure of from about 1075 to about 50,000 psi.

4. The method of claim 1 wherein the acidulated material is immediately extracted from the soaps and into the fluid phase of the supercritical carbon dioxide.

* * * * *